US012038026B2

(12) United States Patent
Blank

(10) Patent No.: US 12,038,026 B2
(45) Date of Patent: Jul. 16, 2024

(54) METHOD OF USING A HYDRAULIC STAKE PULLER

(71) Applicant: The Extractor LLC, Manheim, PA (US)

(72) Inventor: John Z. Blank, Paradise, PA (US)

(73) Assignee: The Extractor, LLC, Manheim, PA (US)

( * ) Notice: Subject to any disclaimer, the term of this patent is extended or adjusted under 35 U.S.C. 154(b) by 422 days.

(21) Appl. No.: 17/672,322

(22) Filed: Feb. 15, 2022

(65) Prior Publication Data

US 2022/0170489 A1 Jun. 2, 2022

Related U.S. Application Data

(63) Continuation-in-part of application No. 16/773,378, filed on Jan. 27, 2020, now Pat. No. 11,332,955, which is a continuation-in-part of application No. 15/865,395, filed on Jan. 9, 2018, now abandoned.

(60) Provisional application No. 62/477,055, filed on Mar. 27, 2017.

(51) Int. Cl.

| | |
|---|---|
| ***B25C 11/00*** | (2006.01) |
| ***B66F 19/00*** | (2006.01) |
| ***E04H 17/26*** | (2006.01) |
| ***F15B 1/26*** | (2006.01) |
| ***F15B 15/20*** | (2006.01) |

(52) U.S. Cl.
CPC .............. *F15B 15/20* (2013.01); *B25C 11/00* (2013.01); *F15B 1/26* (2013.01); *B66F 19/00* (2013.01); *E04H 17/265* (2013.01)

(58) Field of Classification Search
CPC ........ B25C 11/00; B66F 19/00; B66F 19/005; B66F 2700/05; E04H 17/265
See application file for complete search history.

(56) References Cited

U.S. PATENT DOCUMENTS

| | | | | |
|---|---|---|---|---|
| 3,946,988 A * | 3/1976 | Kehren | E02D 9/02 | 254/133 R |
| 7,431,266 B1 * | 10/2008 | Evans | E04H 17/265 | 254/30 |
| 2006/0027793 A1 * | 2/2006 | Kysely | E04H 17/265 | 254/30 |

* cited by examiner

*Primary Examiner* — Tyrone V Hall, Jr.
(74) *Attorney, Agent, or Firm* — Steve O'Donnell

(57) ABSTRACT

A method for using a tool to extract tent stakes from the ground is disclosed. The tool has a portion that houses the motor and hydraulic fluid tank, and a hydraulic cylinder portion the user holds against a tent stake and operates to pull the tent stake. Hydraulic hoses connect the two portions. Separating the motor from the hydraulic cylinder allows the user to manipulate just the portion performing work on the tent stake without having to also lift or stabilize the larger and heavier motor portion. Rotating a handle causes the hydraulic cylinder to extend or retract. A hand guard may be present to prevent accidental crush injuries. The tool is designed to fully extract a stake in two strokes of the hydraulic cylinder.

1 Claim, 5 Drawing Sheets

301

Fig. 5
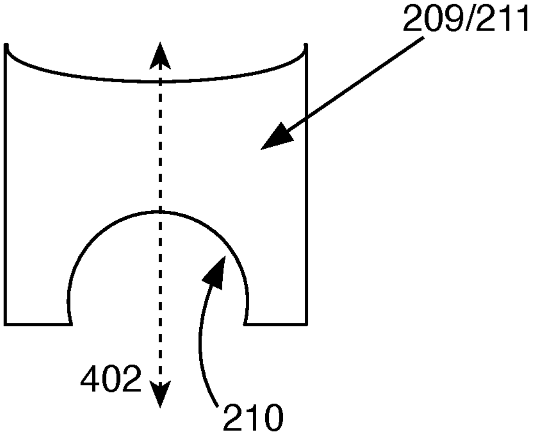
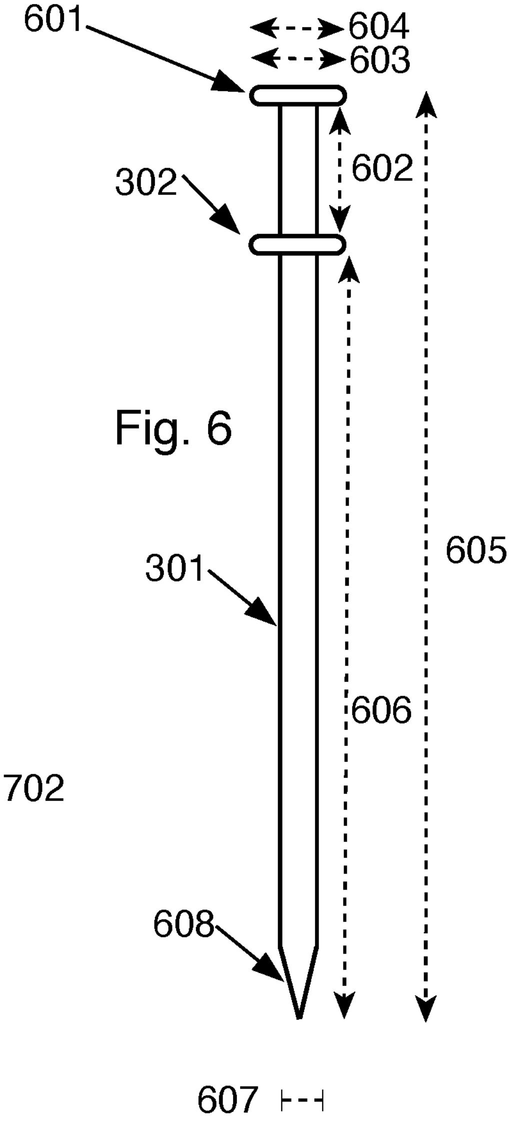
Fig. 6
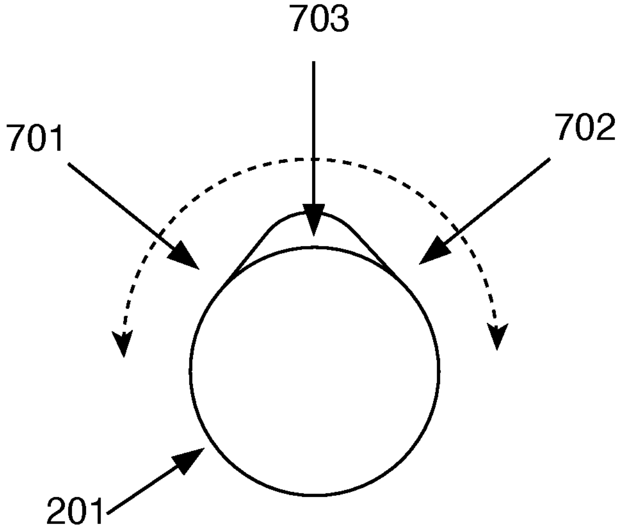
Fig. 7

METHOD OF USING A HYDRAULIC STAKE PULLER

FIELD OF THE INVENTION

The subject matter of this application pertains to pulling devices, particularly hydraulic devices that pull objects embedded in the ground for their removal. More particularly, the subject matter of this application pertains to hydraulic devices used to extract stakes driven into the ground.

BACKGROUND

On every nice day, and many non-so-nice days, there are groups of people outside celebrating something. From graduation parties in the spring, to weddings, birthday parties, family reunions, company and club functions all around the year, people just need an excuse to get together. Of course, no matter how much someone likes the sun or how cold the drinks are, no one really wants to be in the direct sun all day. Realizing this, many party hosts want to provide shade and some protection from the weather. To satisfy this need, many people rent large tents under which their guests can escape the direct sun but still enjoy being outside.

Many people have hidden under such tents, but fewer have seen them put up or taken down. The general process is similar to putting up a small camping tent or a volleyball net, there is a support structure (often including a number of poles) for a tarp and stabilizing ropes that hold the tarp to the ground. These stabilizing ropes are reversibly pinned to the ground by tent stakes. The ropes and stakes prevent the tent blowing over or destabilizing with every gust of wind. For volleyball nets and backyard pup tents, typical stakes are between 6 and 12 inches in length and may be driven in perpendicular to the ground or at an angle. For the larger party tents one may rent for a function, the stakes may be as large as meter or more. The increase in stake length needed is due to the larger tents encountering more force from the wind than smaller tents and to the increased stability needed for more critical applications, i.e., it's one thing if a pup tent on a beach collapses, it's a much different thing if a 30'×60' tent falls onto 150 wedding guests.

It probably would not surprise anyone to learn that driving a nearly meter long stake into the ground takes a bit of effort, and although some may still pound in a few stakes with a sledgehammer, it is more common for people to rely on machines to drive the stakes in place. Similarly, removing the stakes to take down the tent is no small task. For small jobs, people may manually remove the stakes by striking the side with a sledgehammer in order to loosen the ground around the stake and them pulling it out, but for larger jobs such a technique is loathsome. Several devices and techniques for extracting these posts have been introduced over the last few decades. Some are little more than modifications of car jacks, either screw-type or hydraulic, while others are wheeled machines with a hydraulic piston that moves perpendicular to the ground. Other techniques include using equipment such as a small excavator or skid loader, with or without modification to pull the stakes from the ground.

Most of the techniques and devices used to pull stakes work optimally when the stakes are nearly perpendicular to the ground since that's the direction the devices move. The manual technique is most flexible, but is manual. The car jack type pullers are easier to use at an angle than other devices, but are slower and more labor-intensive than the hydraulic pullers, and the hydraulic pullers and heavier equipment methods can be difficult to maneuver and, at least in the case of heavier equipment, be too large and expensive to use as a stake puller for all but the largest jobs.

SUMMARY

The subject matter of this application pertains to device and methods for removing stakes from the ground. More particularly, it pertains to a hydraulic device for pulling tent stakes from the ground. Even more particularly, the subject matter of this application pertains to a hydraulic device for pulling tent stakes from the ground comprising two pulling platforms in which a stake can be fully extracted with two strokes of the hydraulic piston. The disclosed device comprises a motor connected to a hydraulic piston via appropriate hydraulic tubing. The piston component has a portion that presses against the ground as the piston is driven upwards by the action of the hydraulic fluid being operated on by the motor (the "stroke"). As the piston moves upwards, an attached lower claw acts on the head of the tent stake, pulling the stake up with the piston. The piston can then be retracted and repositioned in relation to the stake so that a, upper claw can fully extract the spike following a second stroke. The piston component can be placed at any needed angle by the user and readily held in place because the piston component is smaller and lighter than other hydraulic stake pullers. The piston component further has a pair of handles which control the action of the piston based on whether the user rotates the handles one way or the other. The unique rotational switch is hypothesized to lessen repetitive stress. A safety shield preventing a user from crushing their hands between the handles and environmental obstacles may be present in certain embodiments. The distance between the lower and upper claws, as well as the maximum length of the piston stroke are calculated to accommodate the most common commercial tent stake sizes

BRIEF DESCRIPTION OF THE DRAWINGS

FIG. 5 is a top plan drawing of a claw of the subject matter of this application, isolated from the other components of the stake puller for clarity.

FIG. 6 is an illustration of an exemplary tent stake.

FIG. 7 is a side view of the handle of the state puller, isolated from the other components for clarity.

DETAILED DESCRIPTION

Figure 1:
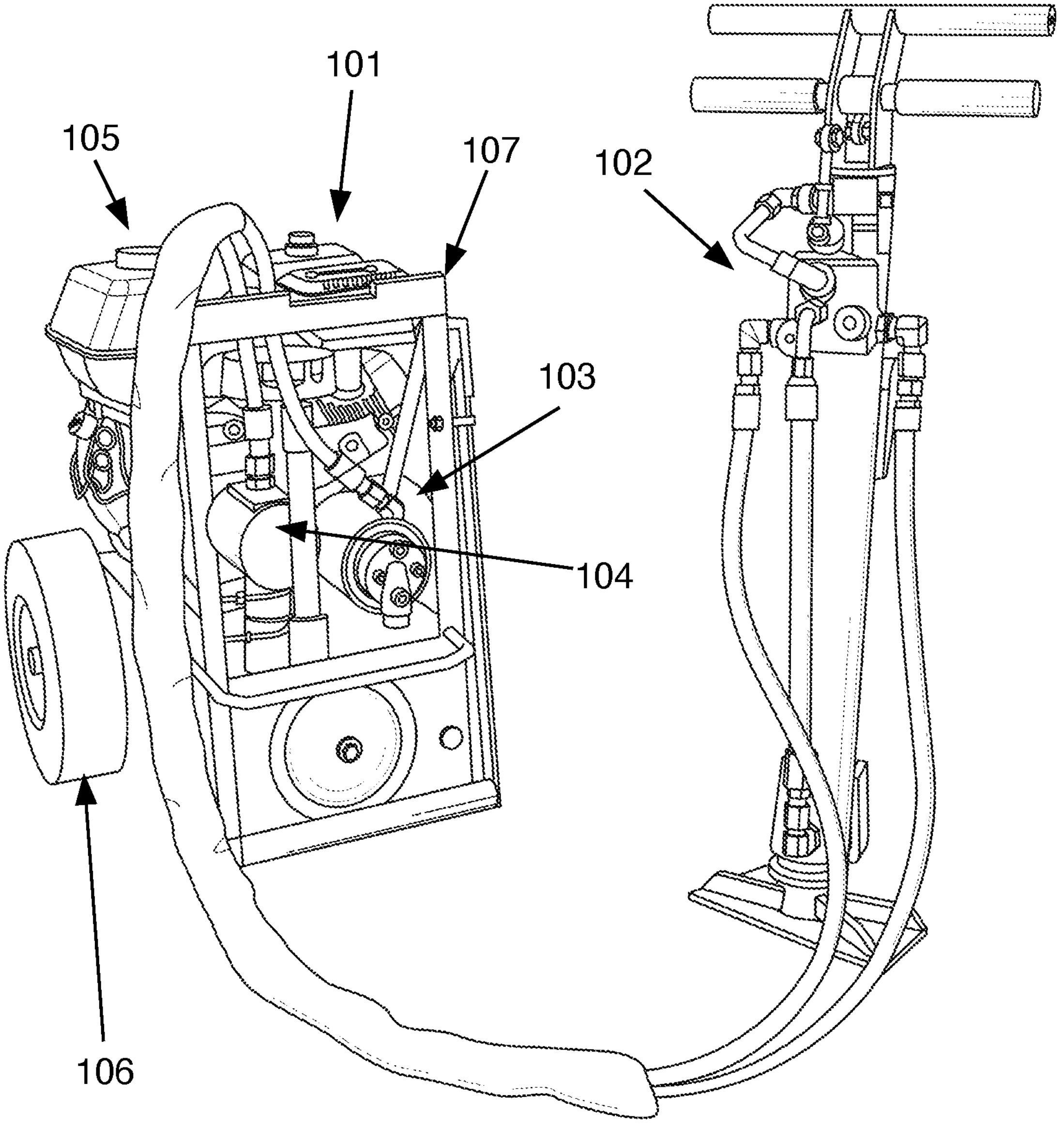
FIG. 1 is a perspective drawing of the hydraulic stake puller.
Figure 2:
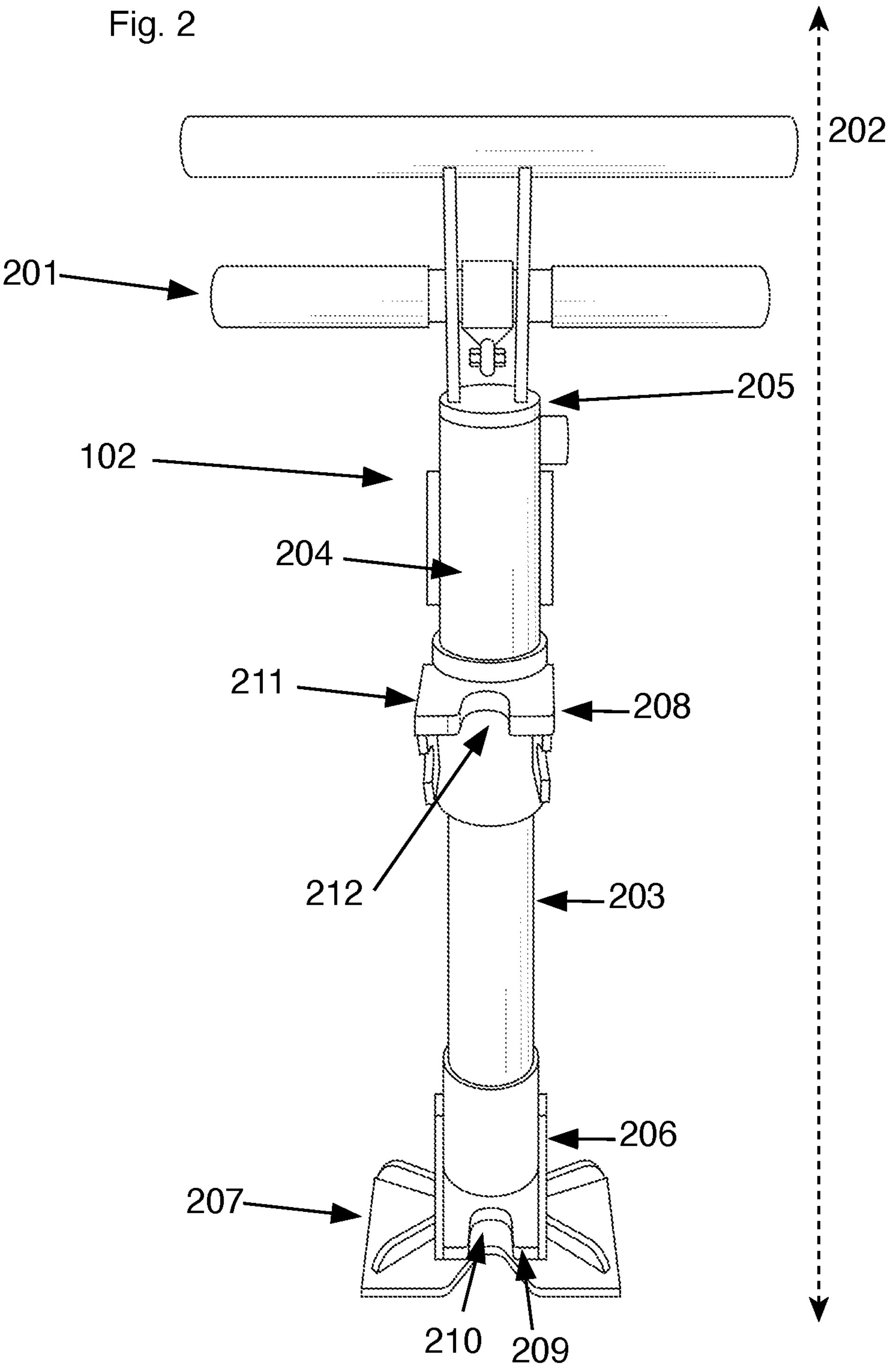
FIG. 2 is a perspective drawing of the piston component of the stake puller.
Figure 3:
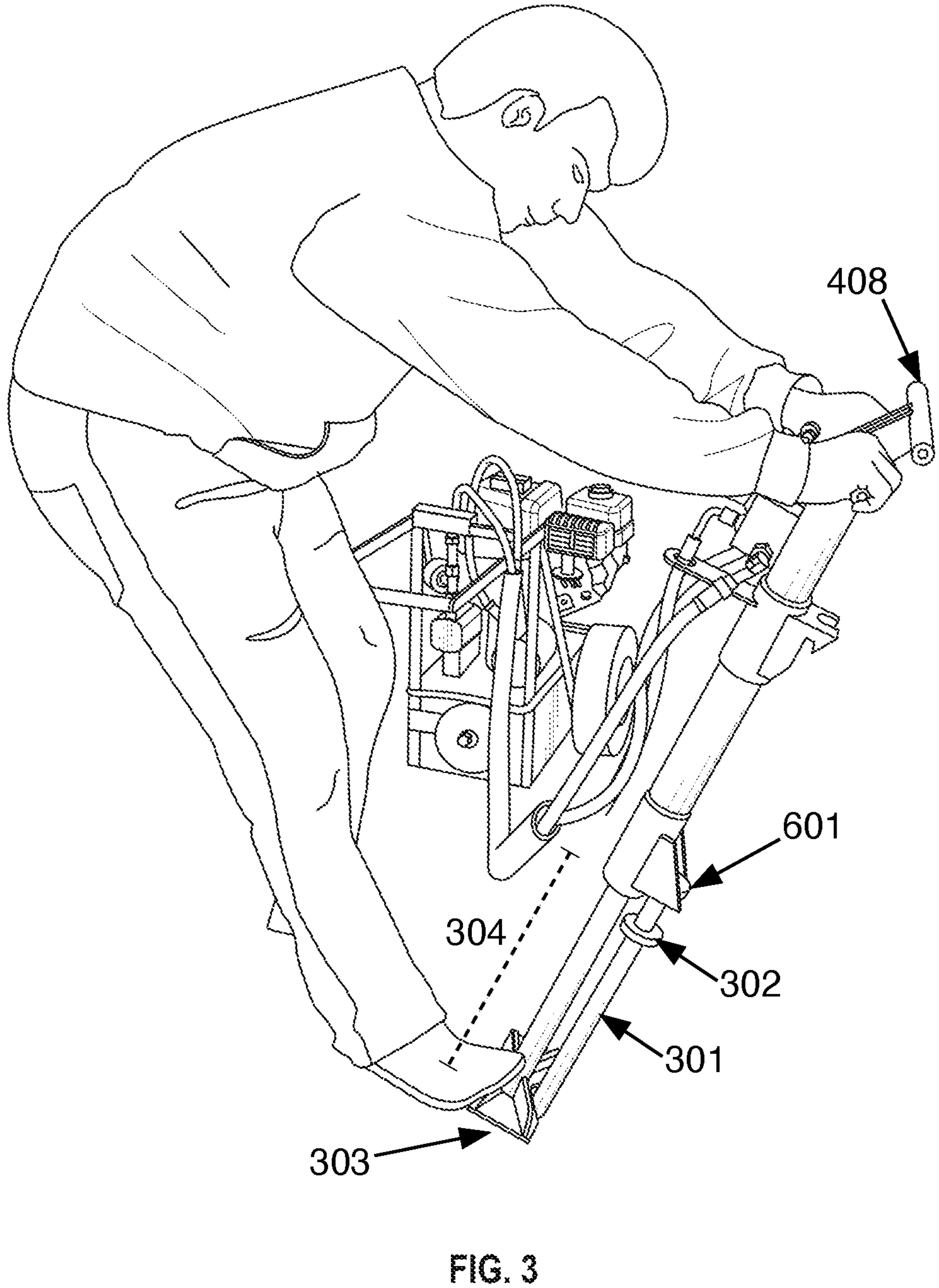
FIG. 3 is a perspective drawing of a user operating the stake puller to remove a stake.
Figure 4:
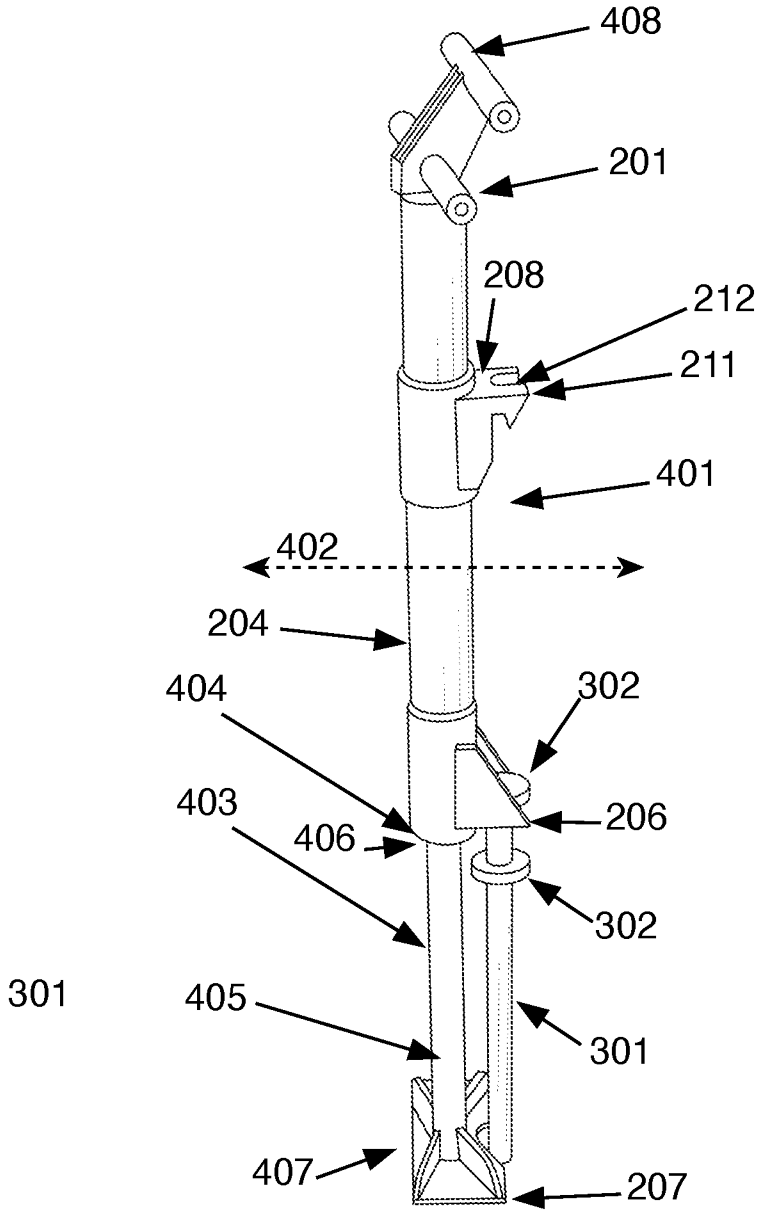
FIG. 4 is another view of the piston component.

The following description and drawings referenced therein illustrate embodiments of the application's subject matter. They are not intended to limit the scope. Those familiar with the art will recognize that other embodiments of the disclosed method are possible. All such alternative embodiments should be considered within the scope of the application's disclosure.

Each reference number consists of three digits. The first digit corresponds to the figure number in which that reference number is first shown. Reference numbers are not necessarily discussed in the order of their appearance in the figures.

The subject matter of this application pertains to tools for removing stakes from the ground although those in the relevant arts may appreciate other applications for the disclosed tool.

A hydraulic stake puller is comprised of a first portion (101), a second portion (102), and one or more hydraulic hoses connecting the first portion to the second portion.

The first portion comprises an engine (103), a hydraulic pump (104), and a hydraulic fluid reservoir (105). Most preferably the first portion further comprises wheels (106), and a housing (107).

The second portion comprises a rotating handle (201), and a hydraulic piston (401). Said hydraulic piston having a longitudinal axis (202), a transverse axis (402), a cylinder (203), and a piston rod (403). The cylinder comprises an outside surface (204), an inside surface, a top (205), and a bottom (404). The outside surface of the cylinder comprises a first claw (206) located near the bottom of the cylinder and a second claw (208) located near the top of the cylinder. The piston rod comprises an outside surface (405), a top (406), and a bottom (407). The bottom of the piston rod further comprises a foot portion (207). In most preferred embodiments, the outside surface of the cylinder further comprises a second claw (208) located above said first claw.

The first claw comprises a platform (209) parallel to the transverse axis of the hydraulic piston (402), said platform comprising a gap (210). Said gap is at least as wide as a tent stake (301), but not as wide as the flanges (302, 601) on a tent stake.

The second claw also comprises a platform (211) parallel to the platform of the first claw. Said platform of the second claw comprises a gap (212) at least as wide as a tent stake (301), but not as wide as the flanges (302, 601) on a tent stake.

The platform of the first claw and the platform of the second claw are separated by an inter-claw distance (602).

The foot portion comprises planar surface (303) that rests against the ground when the hydraulic piston is held upright.

The rotating handle of the second portion comprises a switch activated by rotating the handles. Said switch having at least three positions selected by the user rotating the handles: a first switch position (701) activating the piston rod such that it extends from the cylinder, a second switch position (702) which causes the piston rod to retract into the cylinder, and a third switch position (703) that is neutral and doesn't result in the piston rod moving in relation to the cylinder. Such a rotational switch may decrease stress on the users hands and wrists in comparison to alternative switch designs such as finger or hand triggers. In a most preferred embodiment, the first switch position (701) is reached by the user grasping the handle in the neutral handle position (703) and rotating the handle approximately 30 degrees overhand, and the second switch position (702) is reached by rotating the handle approximately 30 degrees underhand from the neutral switch position. In other embodiments, there are multiple switch positions and the degree of force generated by the piston is determined by the degree of deflection of the rotating handle from the neutral position.

The amount that the piston rod extends from the cylinder in response to a user activating the switch is defined as the stroke length. The stroke length may be from about zero inches to a maximal stroke length (304) which is near the entire length of the piston rod. Some amount of the piston rod must remain within the cylinder, even when fully extended, therefore the maximal stroke length is better defined as the length of the piston rod minus the amount of the piston rod needed to remain in cylinder to maintain stability.

In a most preferred embodiment, the second portion further comprises a hand guard (408). Said hand guard prevents the user's hands from being pinched between the rotating handle and environmental obstacles, such as e.g., branches overhanging the location of a tent stake. One preferred embodiment of the hand guard is comprised of a set of non-rotating handles located above, and parallel to, the rotating handles although others familiar with the relevant arts will recognize other hand guard designs that would also protect the user.

A common tent stake used to anchor those tents suitable for the the applications contemplated by this application has a primary diameter (607), a tapered end (608), a bottom flange (302) having a diameter (603), a top flange (601) having a diameter (604), a total length (605), an inter-flange portion having a length (602), and an insertable length (606) approximately equal to the total length of the tent stake minus the inter-flange length of the tent stake. When used to anchor a tent, then entire insertable length is driven into the ground.

In operation, the user moves the hydraulic stake puller near the location of a stake driven into the ground. The user starts the motor and positions the cylinder of the second portion of the hydraulic stake puller such that the foot portion of the piston rod is against the ground. Once the foot portion is in position, the stake pulling action has a first phase and a second phase. In the first phase, the gap of the platform of the first claw surrounds the inter-flange portion of the tent state. The user rotates the handle to cause the piston rod to extend from the cylinder and as the foot of the piston rod presses against the ground, the cylinder is driven away from the ground, causing the first claw to contact the top flange of the tent stake and pull the stake out of the ground. Most preferably, this length of the piston stroke is equal to the maximal stroke length so at the end of the stroke, the stake has been pulled out of the ground an amount approximately equal to the maximal stroke length. In the second phase of the of the stake pulling action, the user rotates the handle into the second position cause the piston rod to retract into the cylinder, the second claw is moved into position to contact either the top, or preferably, the bottom flange of the stake, and the user again rotates the handle to extend the piston rod. In the most highly preferred embodiment, the inter-claw distance is approximately equal to the maximal stroke length, and is also approximately one have of the insertable length of a tent stake. In this way, the height of the hydraulic stake puller when the piston rod is fully retracted into the cylinder is roughly half of what it would need to be in order to fully extract a tent stake in a single stroke of the piston. However when used as taught in this application, the action of the hydraulic stake puller is sufficient to fully extract a tent stake from the ground without the need for the user having to let go of the hydraulic stake puller and grab or pull the stake, allowing the user to more rapidly extract stakes.

The invention claimed is:

1. A method of extracting tent stakes inserted into the ground with a tool, in which said tent stakes comprise an insertable length, a top flange, a bottom flange, and an inter-flange length, and A) in which said tool comprises a first portion, a second portion, and at least one hydraulic hose connecting said first portion to said second portion;

i) Said first portion comprising an engine, a hydraulic pump, and a hydraulic fluid reservoir;

ii) Said second portion comprising a hydraulic piston;

a) said hydraulic piston comprising a longitudinal axis, a transverse axis, a top, a bottom, a cylinder, and a piston rod;

b) said cylinder comprising an inside surface having a diameter, an outside surface, a top, a bottom, a first claw, and a second claw;

c) said piston rod comprising an outer surface, a top, and a bottom;

d) said outer surface of the piston rod having a diameter smaller than the diameter of the inner surface of the cylinder;

e) said bottom of the piston rod bottom further comprising a foot portion, parallel to the transverse axis of the hydraulic piston;

f) said piston rod capable of extending from said cylinder by a maximal stroke length;

g) said first claw being located near the bottom of the cylinder, and comprising a platform and gap in said platform at least as large as the diameter of a tent stake, but not as large as the flange of a tent stake;

h) said second claw being located near the top of the cylinder, and comprising a platform and gap in said platform at least as large as the diameter of a tent stake, but not as large as the flange of a tent stake;

i) said first claw and said second claw being separated by an inter-claw distance;

j) said inter-claw distance being approximately the same as the maximal stroke length; and k) said inter-claw distance being approximately half of the tent stake insertable length;

iii) said method comprising the steps of:

a) positioning the first claw of the cylinder of the hydraulic piston of the second portion of the tool such that the inter-flange length of a tent stake is within the gap of the platform of the first claw;

b) operating the tool to cause the piston rod to extend from the cylinder, pushing the platform of the first claw against the top flange of the tent stake thereby partially extracting the tent stake from the ground;

c) operating the tool to cause the piston rod to retreat into said cylinder;

d) positioning the second claw of the cylinder of the hydraulic piston of the second portion of the tool such that the inter-flange length of said tent stake is within the gap of the platform of the first claw; and e) operating the tool to cause the piston rod to extend from the cylinder, pushing the platform of the second claw against the top flange of the tent stake thereby extracting the tent stake from the ground.

* * * * *